March 17, 1936.  C. M. YODER  2,033,967
MACHINE FOR FINISHING CYLINDRICAL BODIES OR PIPES
Filed June 6, 1931  10 Sheets-Sheet 2
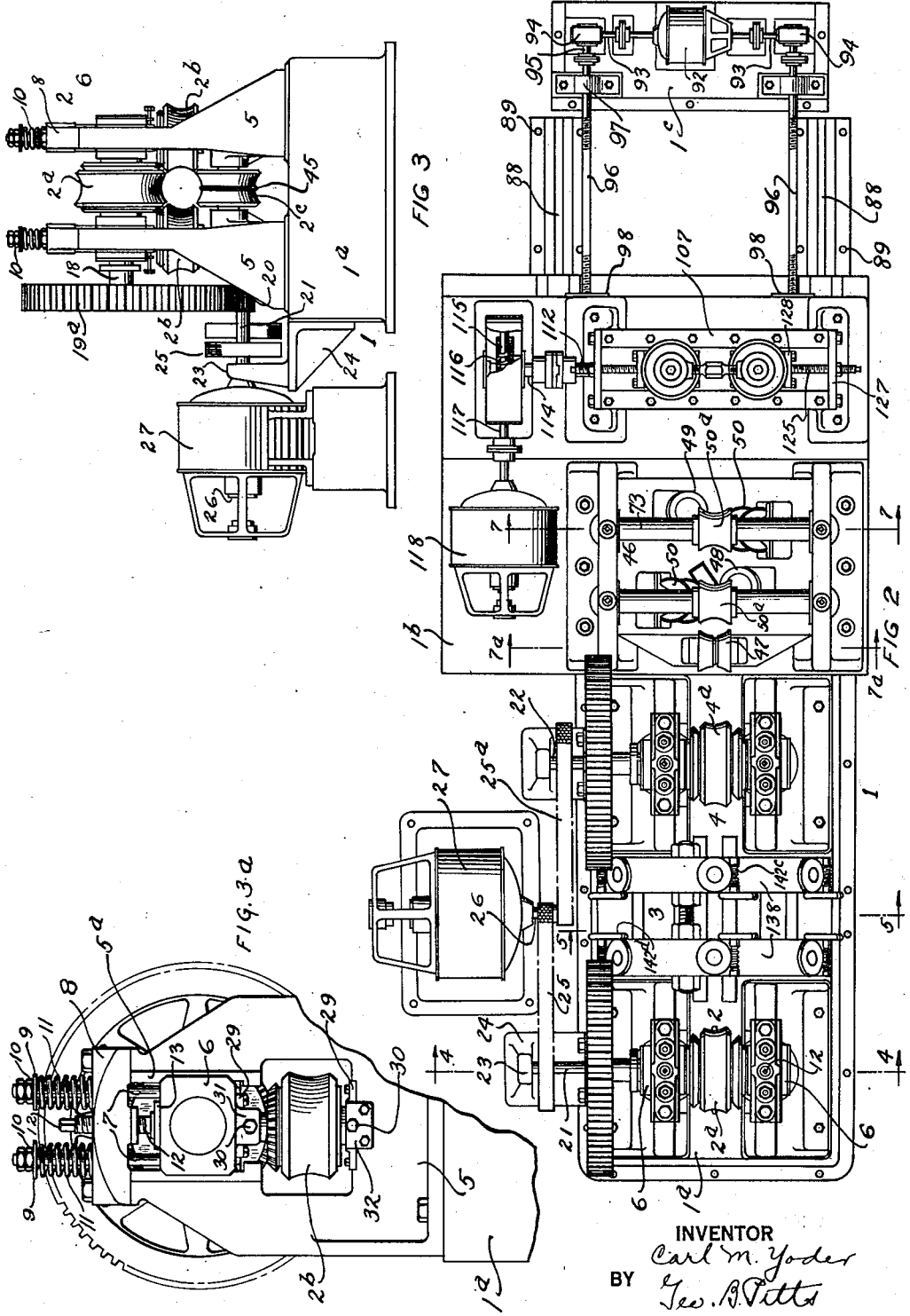
INVENTOR
Carl M. Yoder
BY Geo. B. Pitts
ATTORNEY March 17, 1936.  C. M. YODER  2,033,967
MACHINE FOR FINISHING CYLINDRICAL BODIES OR PIPES
Filed June 6, 1931 10 Sheets-Sheet 4
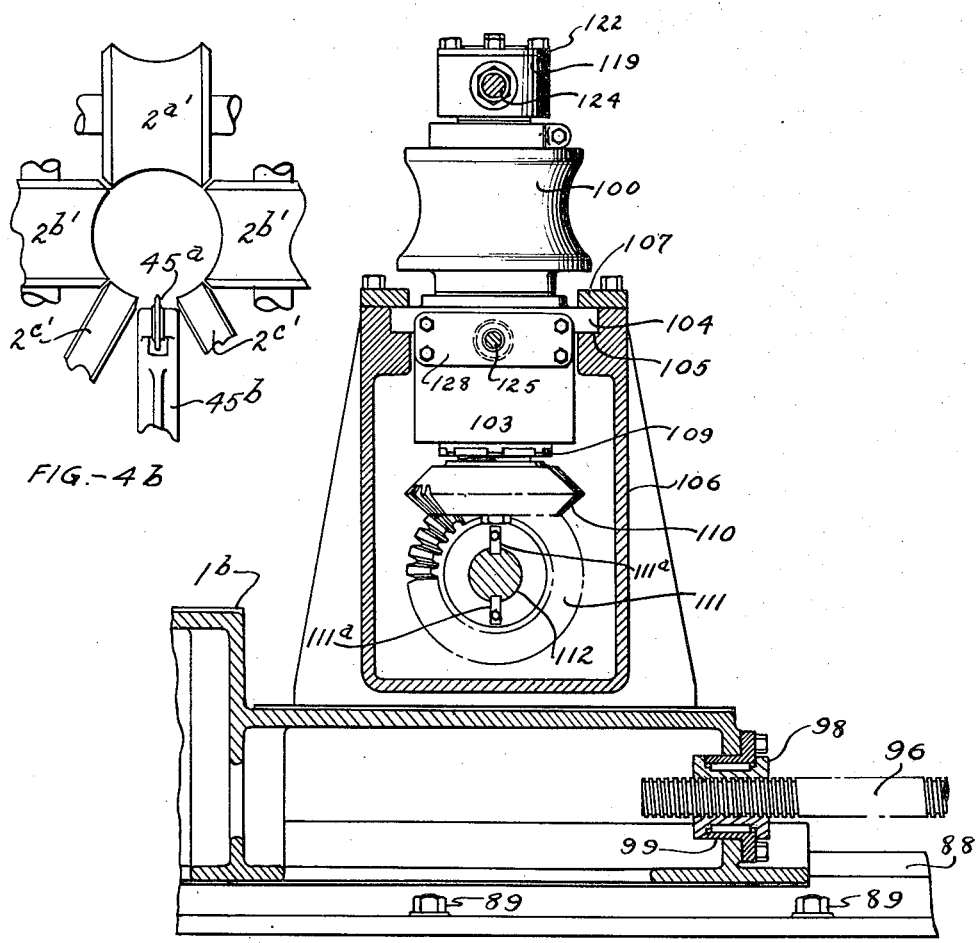
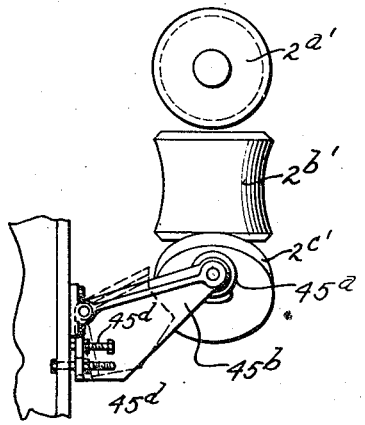
INVENTOR
Carl M. Yoder
BY Geo. B Titts
ATTORNEY.

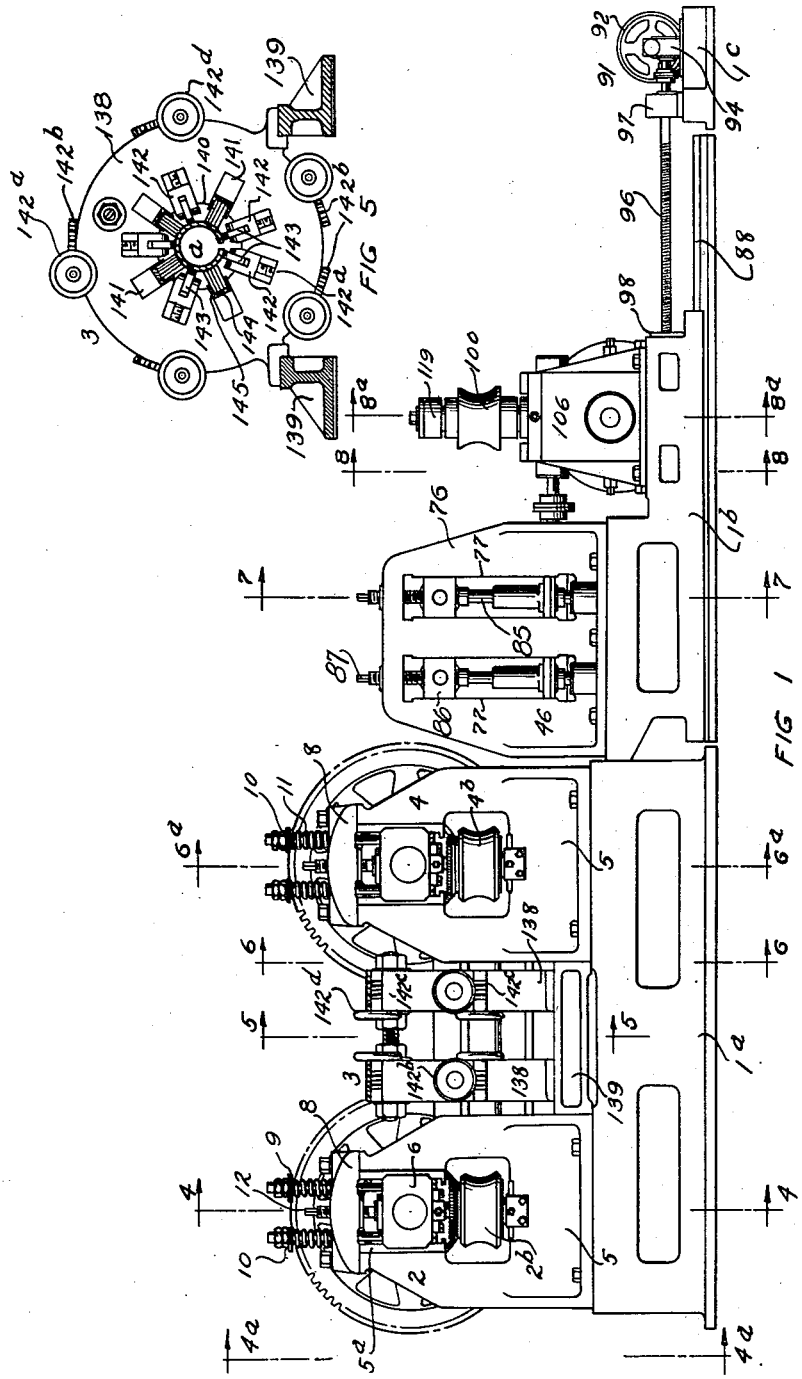

March 17, 1936.    C. M. YODER    2,033,967
MACHINE FOR FINISHING CYLINDRICAL BODIES OR PIPES
Filed June 6, 1931    10 Sheets-Sheet 7

INVENTOR
Carl M. Yoder
BY Geo. A. Pitts
ATTORNEY

March 17, 1936.  C. M. YODER  2,033,967
MACHINE FOR FINISHING CYLINDRICAL BODIES OR PIPES
Filed June 6, 1931   10 Sheets-Sheet 8

INVENTOR
Carl M. Yoder
BY
Geo. A. Pitts
ATTORNEY

March 17, 1936.   C. M. YODER   2,033,967
MACHINE FOR FINISHING CYLINDRICAL BODIES OR PIPES
Filed June 6, 1931   10 Sheets-Sheet 9
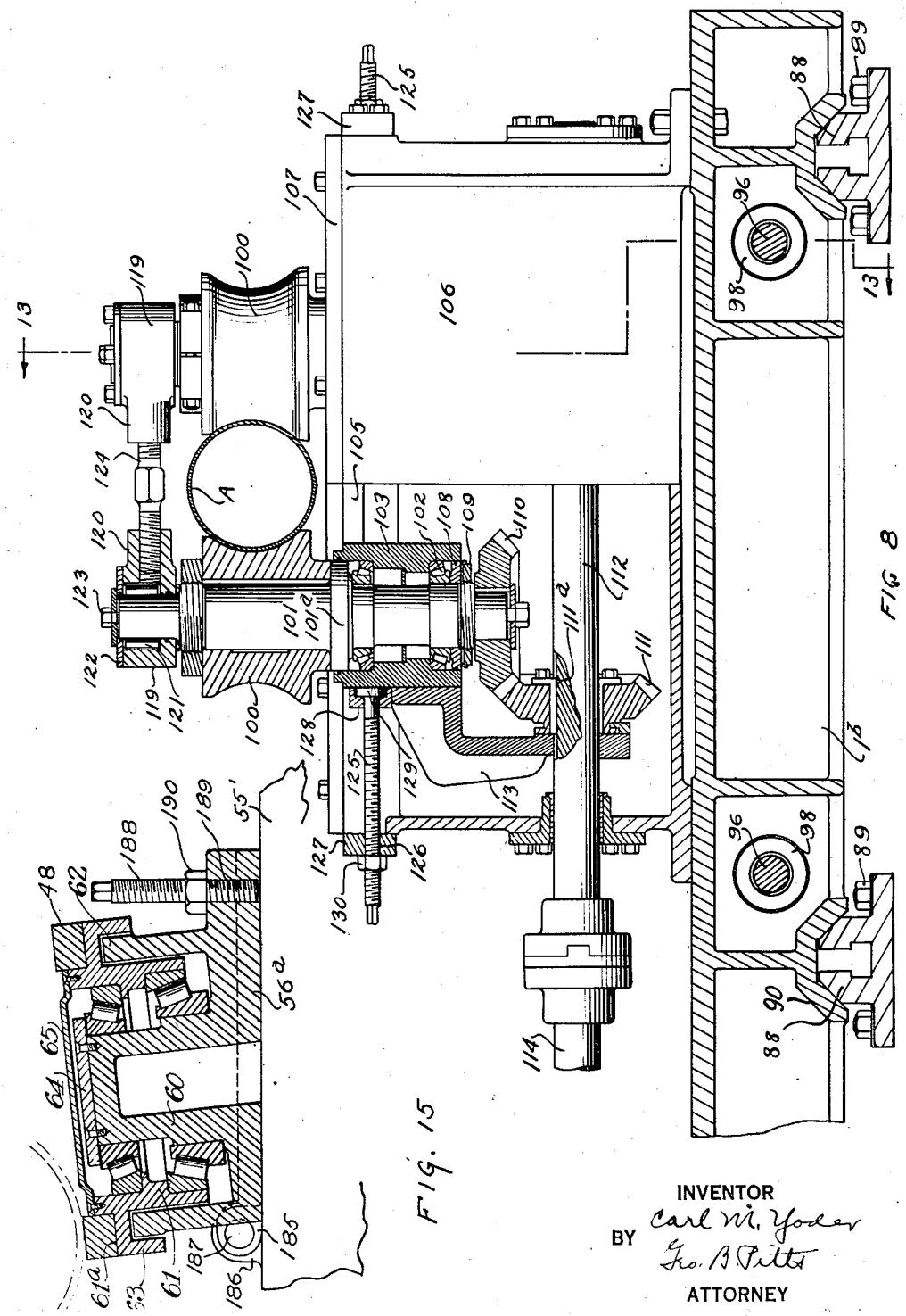
INVENTOR
Carl M. Yoder
BY
Geo. B Pitts
ATTORNEY March 17, 1936. C. M. YODER 2,033,967
MACHINE FOR FINISHING CYLINDRICAL BODIES OR PIPES
Filed June 6, 1931 10 Sheets-Sheet 10

INVENTOR
Carl M. Yoder
BY
Geo. B. Pitts
ATTORNEY

Patented Mar. 17, 1936

2,033,967

UNITED STATES PATENT OFFICE 2,033,967

MACHINE FOR FINISHING CYLINDRICAL BODIES OR PIPES

Carl M. Yoder, Lakewood, Ohio

Application June 6, 1931, Serial No. 542,670

18 Claims. (Cl. 164—60)

This invention relates to a machine for welding and finishing hollow bodies, such as pipes made from sheet metal or sheet steel. The machine herein d'sclosed is adapted for the welding and finishing of pipes of varying diameters, for example, pipes ranging from 12 inches to 26 inches in diameter, and formed from sheet stock which may be one-fourth or three-eighths inches in thickness.

The machine herein shown is constructed to operate upon bodies that are cylindrical in cross section, but such shape is shown merely as illustrative of the preferred application of the invention.

One object of the invention is to provide a machine of this character in which the welding and finishing of formed bodies is effected in a rapid manner.

Another object of the invention is to provide an improved machine of this character, which may be readily adapted to cylindrical bodies of different diameters and also bodies formed of different thickness of metal.

Another object of the invention is to provide in an apparatus for welding the side edges of a hollow body, improved means for controlling the spacing of the side edges of the body and the compressing of said edges together dependent upon the diameter of the body, thickness of its walls, the hardness and ingredients of the metal constituting such walls, whereby the welding flash may be effectively applied.

Another object of the invention is to combine with a welding apparatus, an improved finishing mechanism, whereby the resulting welding bead is removed to provide the body with a cylind:ical exterior surface throughout its entire length.

A further object of the invention is to combine with a welding apparatus, in which the welding is effected on the lower side of the formed body, an improved finishing mechan:sm arranged to remove the resulting welding bead without rotating the body.

Another object of the invention is to provide improved mountings for certain of the sets of rolls.

Other objects of the invention will be apparent to those skilled in the art to which my invention relates from the following description taken in connection with the accompanying drawings, wherein—

Fig. 1 is a side elevation of a mach'ne embodying my invention.

Fig. 2 is a plan view.

Fig. 3 is an end elevation looking toward the right of Figs. 1 and 2.

Fig. 3a is a fragmentary elevation of parts shown in Figs. 1, 2, and 3, somewhat enlarged.

Figure 4:
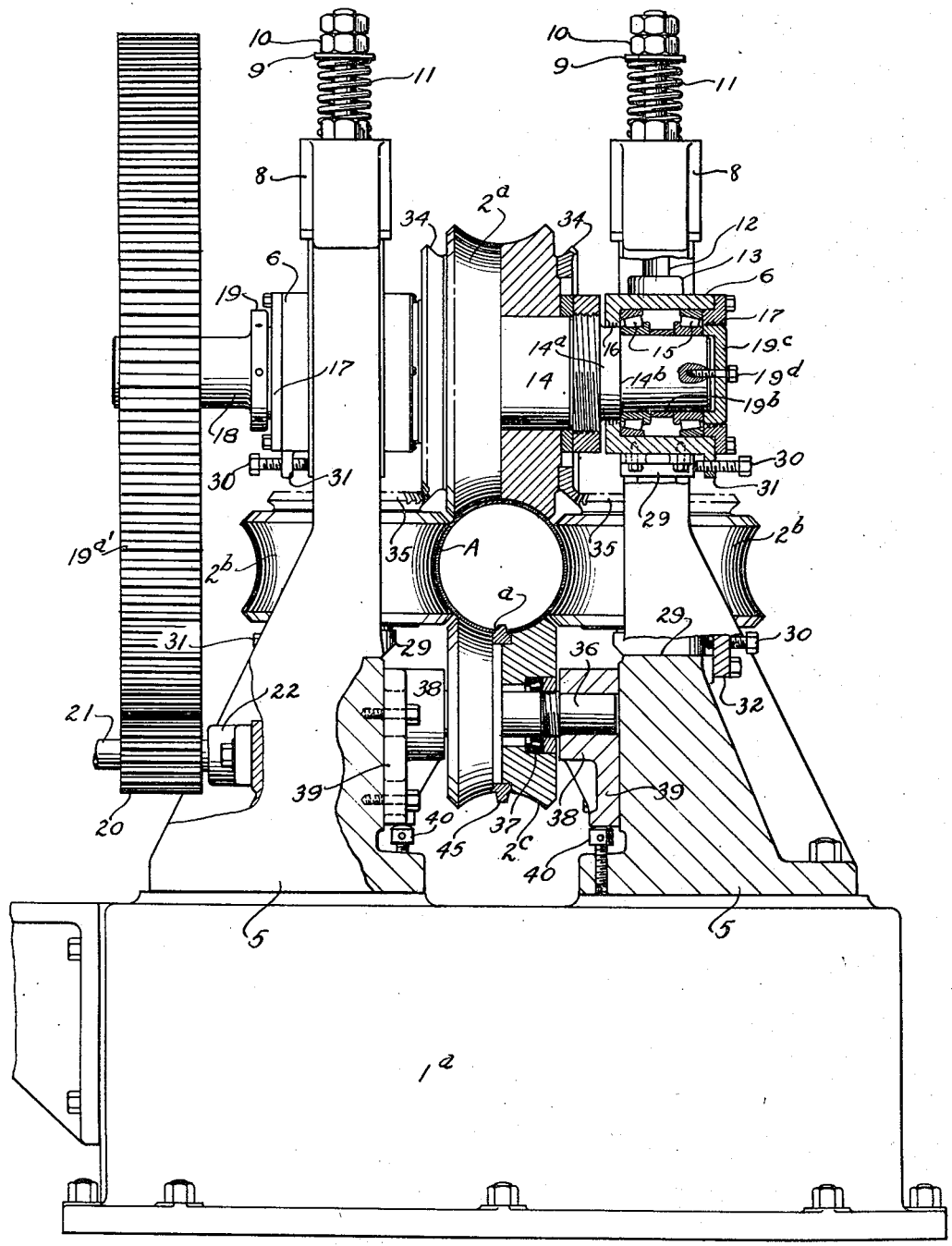

Fig. 4 is a section (enlarged) partly on the line 4—4 of Figs. 1 and 3 and partly on the line 4a—4a of Fig. 1.

Figs. 4a and 4b are fragmentary views of parts herein referred to as a modification.

Fig. 5 is a section on the line 5—5 of Figs. 1 and 2.

Figure 6:
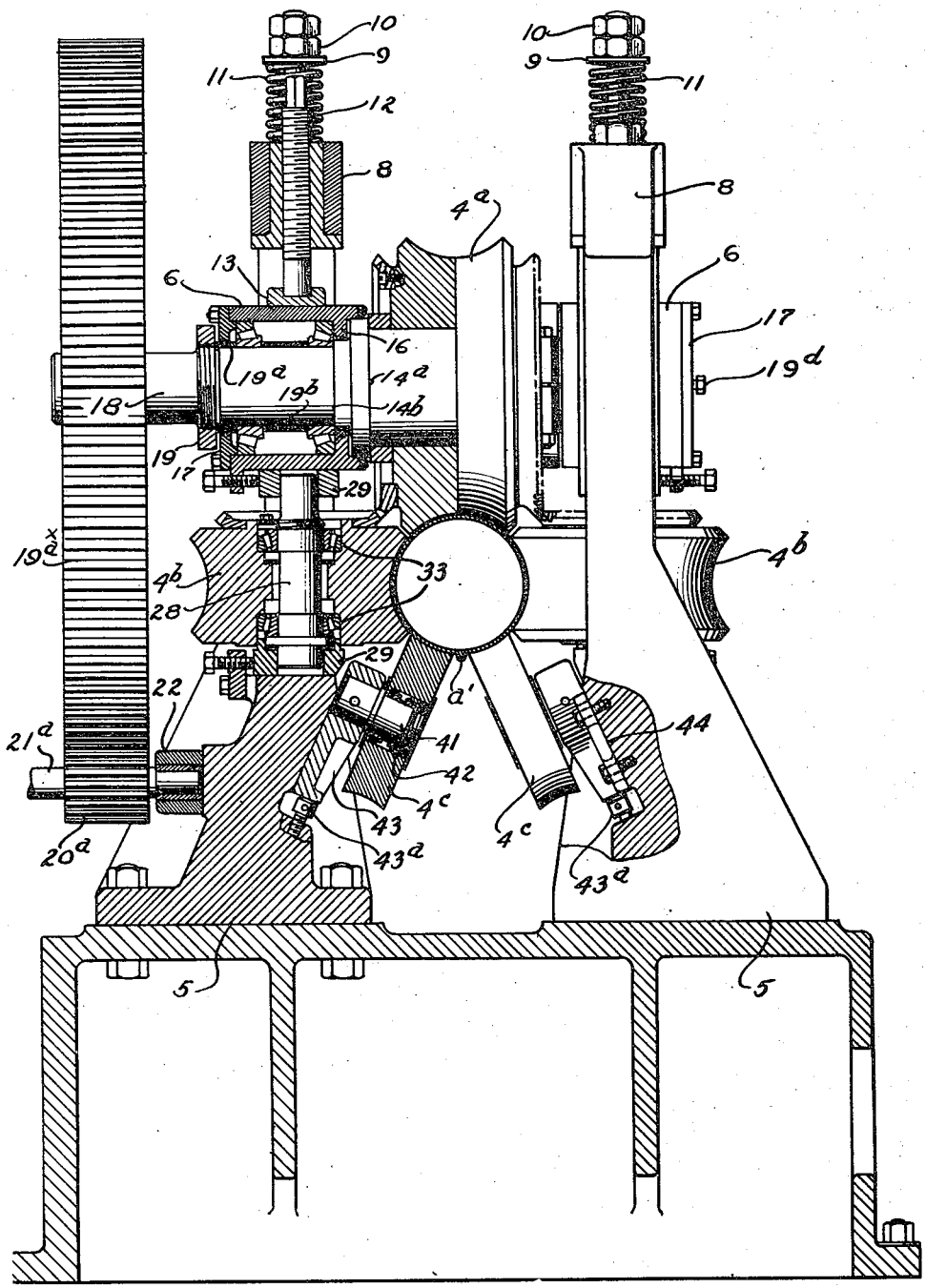

Fig. 6 is a section, somewhat enlarged, partly on the line 6—6 and partly on the line 6a—6a of Fig. 1.

Figure 7:
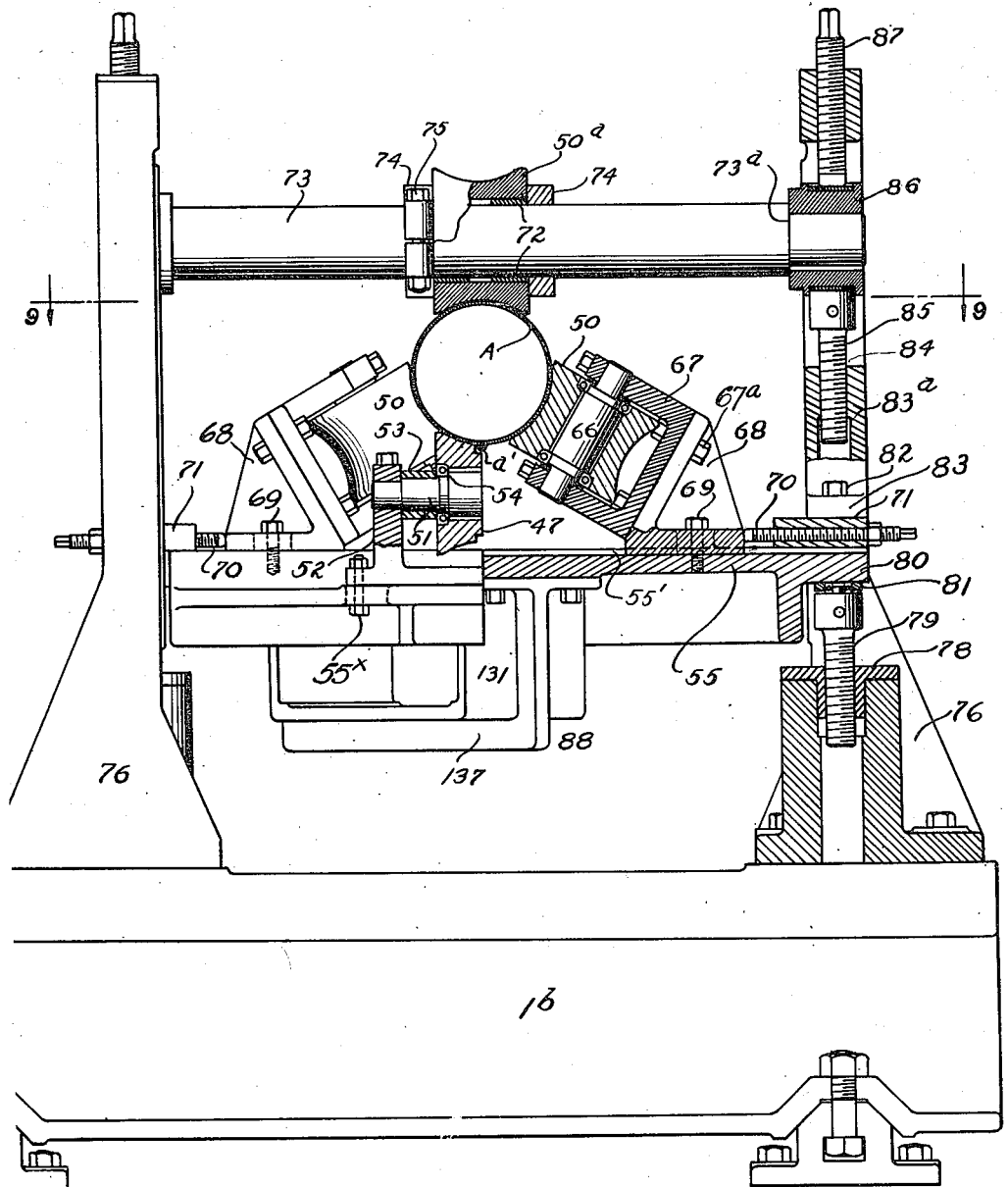

Fig. 7 is a section, partly on the line 7—7 of Figs. 1 and 2 and partly on the line 7a—7a of the latter view.

Fig. 8 is a section partly on the line 8—8 and partly on the line 8a—8a of Fig. 1.

Figure 9:
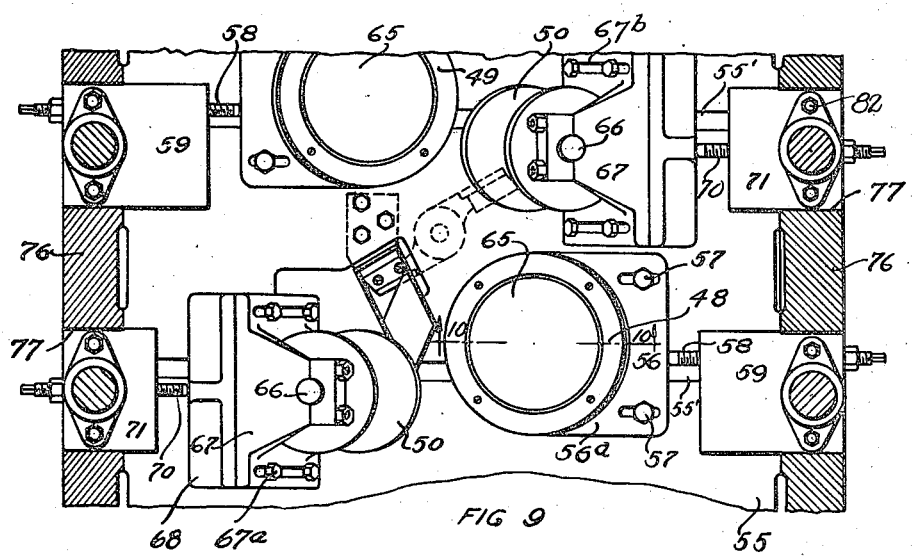

Fig. 9 is a section on the line 9—9 of Fig. 7.

Figure 10:
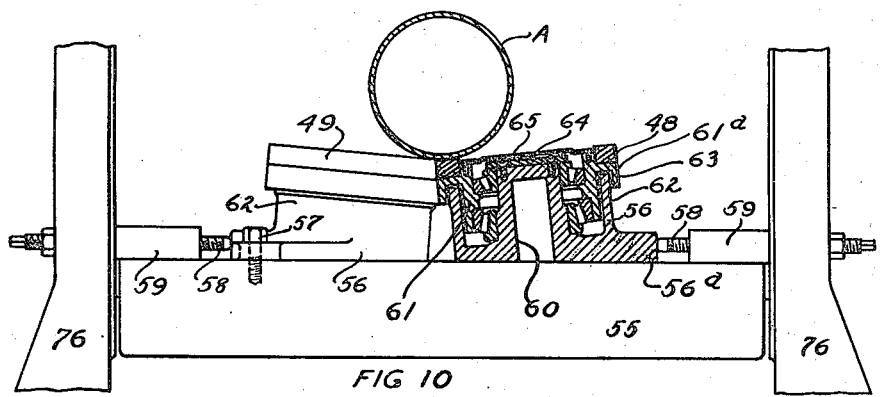

Fig. 10 is an elevation of parts shown in Fig. 9, but partly in section on the line 10—10 thereof.

Figure 11:
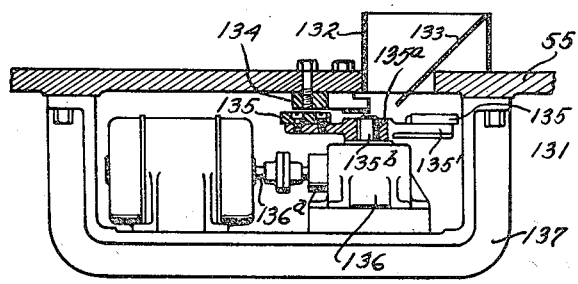
Figure 12:
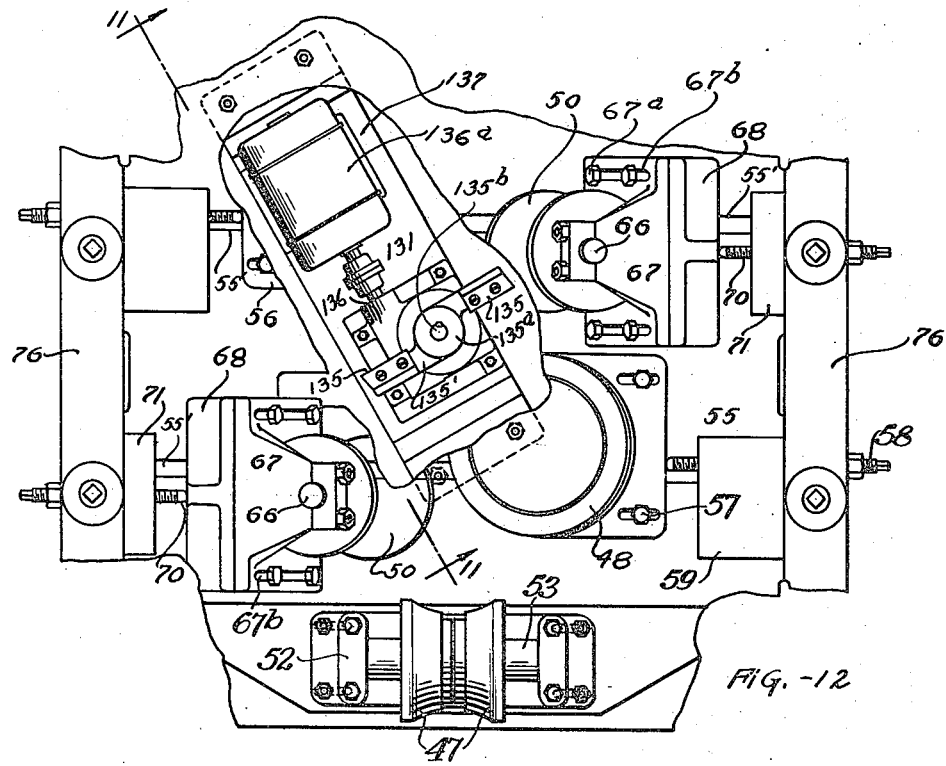

Fig. 11 is a fragmentary section on the line 11—11 of Fig. 12; the cutter being shown in a different angular position, with a portion thereof and the discharge chute in section.

Fig. 12 is a view similar to Fig. 9, but with parts broken away to show in plan parts shown in Fig. 11.

Fig. 13 is a section on the line 13—13 of Fig. 8.

Figs. 14, 14a, 14b, and 14c are diagrammatic views.

Fig. 15 is a sectional view of a cutter, showing a modified form of construction.

Figure 16:
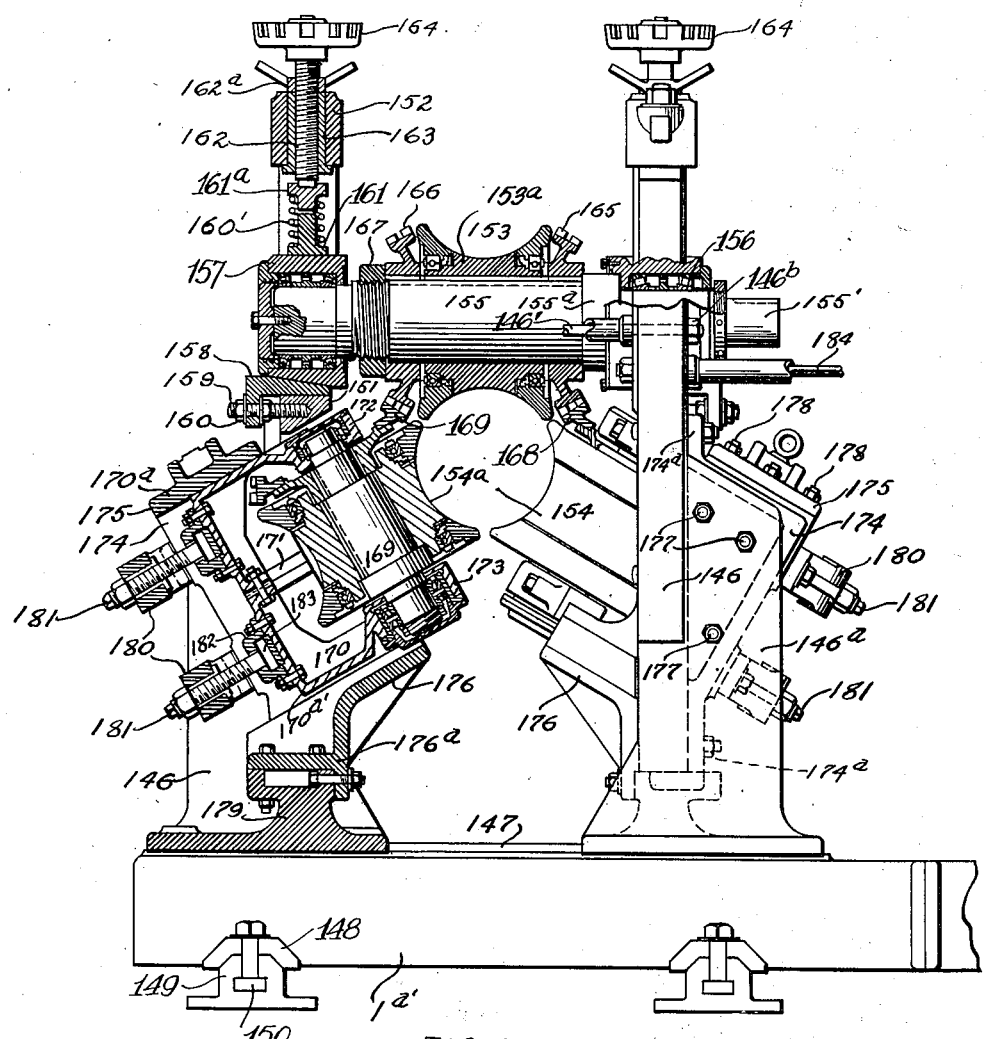

Fig. 16 is a view partly in elevation and partly in section of a set of rolls the mounting and construction of which are somewhat different from that shown in Figs. 1, 2, and 3.

In the drawings, 1 indicates as an entirety a supporting means, which may comprise a plurality of frames, 1a, 1b, 1c, each adapted to support one or more groups of related elements or devices. These frames may be connected together when found necessary.

2 indicates as an entirety a set of supporting and feeding rolls disposed in front of a welding apparatus, indicated as an entirety at 3. By preference the feeding rolls 2, welding apparatus 3 and a set of supporting and delivering rolls 4 are mounted on the frame 1a, in aligned relation to receive a cylindrical body or pipe A and move it endwise, the sets of rolls 2 and 4 serving to support the body A in fixed relation to the elements of the welding apparatus 3 while passing through the latter. The cylindrical bodies or pipes may be formed by suitable apparatus, such for example, the apparatus shown in my co-pending application filed October 4, 1930, Ser. No. 488,499, following which each body is rolled into an inverted position, that is, that position in which its welding seam *a* is at the bottom.

In the form of construction shown in Figs. 1, 2, 3, 3a, and 4, the set of rolls 2 comprises an upper roll 2a, side rolls 2b and a bottom roll 2c, the peripheries of the rolls being concaved and related to surround the pipe A and engage substantially with its entire circumference (see Fig. 4), whereby feeding of the pipe is effected without danger of distorting it. The set of rolls 4 comprises an upper roll 4a, side rolls 4b and a pair of lower rolls 4c, 4c (see Fig. 6).

In the preferred arrangement, the pipe A is delivered to the rolls 2 in inverted position, that is, with its seaming walls *a* at the bottom, as above set forth.

The upper roll and side rolls of the set of rolls 2 and the corresponding rolls of the set 4 are supported substantially in the same manner so that the following description will be sufficient, reference being had to Figs. 4 and 6 for a clear understanding of their mountings: 5, 5, indicate spaced standards suitably bolted to the frame 1a. The standards 5 are formed with vertical slots or guides 5a in which are mounted the bearing supports for the rolls 2a, 2b, 2b. The bearing supports for the roll 2a comprise journal boxes 6, each having upwardly extending rods 7, which extend through openings formed in a bridge member 8, the latter being suitably bolted to the upper ends of the adjacent standard 5. Between the bridge member 8 and a collar 9 held on the upper end of each rod 7 by a nut 10, is a coiled spring 11. The springs 11 serve normally to raise the journal boxes 6. 12 indicates a rod having a threaded portion threaded through a threaded opening in each bridge member 8 (or a nut mounted therein) and engaging a pad or step 13 on the upper side of the adjacent box 6. The rod 12 is adjusted against the tension of the springs 11 to hold the box in the desired position, whereby the roll 2a is properly related to the side rolls 2b. The roll 2a is fixed to a shaft 14, the opposite ends of which extend through the journal boxes 6 and engage anti-friction bearings therein. Each journal box is provided with inner and outer anti-friction roller bearings 15, 15. The outer race for the inner bearing seats against an inwardly extending flange 16 provided on the inner end of the box 6; and the outer race for the outer bearing seats against a ring 17 removably bolted to the outer end of the box 6. The shaft 14 has at each side of the roller 2a stepped portions 14a, 14b, the latter fitting within the flange 16 and serving as a seat for the inner race of the inner bearing and the former engaging the inner side of the flange to close the box 6 and to prevent endwise movement of the shaft. One end of the shaft 14 extends through the adjacent ring 17, as shown at 18, and is reduced to provide for a nut 19 threaded on the extended portion, which nut engages a sleeve or collar 19a on the shaft to hold it against outward movement. The sleeve 19a provides a seat for the inner race of the outer bearing. The inner races for both bearings are held in spaced relation by a sleeve 19b. The inner race of the outer bearing in the journal box, for the opposite end of the shaft 14, is seated against the inturned annular end of a cap 19c, held in position by a bolt 19d threaded into the adjacent end of the shaft 14. The shaft end carries a gear 19a', by which the shaft 14 is driven. The gear 19a', meshes with a pinion 20 fixed to a jack shaft 21, which is mounted at its inner end in a bearing 22 (see Fig. 6) and at its outer end in a bearing 23, provided on a bracket 24. The shaft 21 is provided with a sprocket over which a silent chain 25 runs, the chain 25 running over a sprocket fixed to the shaft 26 of an electric motor 27.

Each side roll 2b is rotatably mounted on a shaft 28 the upper and lower ends of which fit into hollow bosses provided on plates 29. The upper plate 29 is bolted to the lower side of the adjacent journal box 6 and the lower plate 29 is bolted to the bottom wall of the guide 5a of the adjacent standard 5, the openings for the bolts in these plates being elongated (see Fig. 4) to permit adjustment of the plates transversely to position the adjacent roll in the desired relation to the remaining rolls of the set. This adjustment may be effected inwardly by bolts 30, the bolt for the upper plate 29 being threaded through a wall 31 depending from the adjacent journal box 6 and the bolt 30 for the lower plate 29 being threaded through a wall 32 suitably bolted to the standard 5. 33 indicates tapered roller bearings between each side roll 2b and its shaft 28 (see Fig. 6).

The side rolls 2b are preferably driven, their peripheries having the same speed as the periphery of the roll 2a. In the illustrated form of construction, the side rolls 2b are driven by the roll 2a. To provide for such operation bevel gears 34 (of ring shape) are secured to the opposite sides of the roll 2a and each gear meshes with a bevel gear 35 suitably secured to the upper side of the adjacent side roll; the gears being proportioned to secure the same peripherial speeds for the rolls 2a, 2b.

The rolls 4b are driven by the roll 4a in a manner similar to that described above in connection with the rolls 2a, 2b; and the roll 4a is driven through a gear 19a, pinion 20a, shaft 21a, sprocket fixed to the latter, silent chain 25a and sprocket fixed to the motor shaft 26, these driving elements being mounted and arranged similar to corresponding elements for driving the roll 2a, as already described.

The lower roll 2c is preferably loosely mounted on a shaft 36, by means of anti-friction roller bearings, one such bearing being shown at 37 in Fig. 4. The opposite ends of the shaft 36 are mounted in hollow bosses 38 provided on blocks 39, which are adjustably bolted to the inner side walls of the standards 5, 5, for the set of rolls 2, the openings for the bolts being elongated to permit of such adjustment. Each block 39 may be adjusted by means of a bolt or jack screw 40 threaded into the base portion of the adjacent standard 5 (see Fig. 4).

The pair of rolls 4c are disposed at angles to each other so as to engage the pipe A at opposite sides of the welding bead *a'* resulting from the welding operation. Each roll is loosely mounted on a stud shaft 41, by means of roller bearings 42, 42. Each shaft 41 is fixed in an opening formed in a bracket 43, the body portion of which slidably fits into an inclined guide way 44 formed in the base portion of the adjacent standard 5. The body portion of each bracket 43 is adjustably bolted to the adjacent standard, the openings for the bolts being elongated to permit of adjustment of the bracket when the bolts are loosened. Each bracket 43 is adjusted by means of one or more bolts or jack screws 43a threaded into the walls of the adjacent standard 5.

When desired, or for the reasons later set forth, the forward set of rolls may be similar in arrangement to the set of rolls 4, whereby two spaced rolls instead of a single roll engage the bottom portion of the body A.

From the foregoing description, it will be noted that each roll of the set of rolls 2 and set of rolls 4 is removable and also adjustable for the following reasons: (1) to adapt the machine to hollow bodies of different diameters, (2) to adapt the machine to bodies the walls of which are formed of different thicknesses of metal, and (3) to effect the movement of the side edges $a$ of each body toward each other in relation to the electrodes or current supplying brushes of the welding apparatus 3, whereby the welding flash may be effectively controlled, dependent upon the thickness of the body walls, the hardness and resiliency of the metal of the walls and the particular ingredients (carbon and other elements) contained therein. For this latter reason, the sets of rolls 2 and 4 co-operate with a spacing device 45 adapted to maintain the side edges $a$ separated the desired distance, so that these edges may be moved together at the desired angle under the action of the rolls 2, 4 and rolls, which are associated with the welding apparatus and which will be later described. The spacing device may be carried by one of the rolls of the forward set of rolls 2 (see Fig. 4) or it may be independently mounted, as shown in Figs. 4a and 4b. When the spacing device is mounted independently of the forward rolls I prefer to employ a set of rolls, such as shown at 2a', 2b', 2b', 2c', 2c' forwardly of the welding apparatus 3, the rolls 2c', 2c', being separated to provide for the mounting of the spacing deivce.

In the form of construction shown in Figs. 1 and 4, the spacing device 45 comprises a circumferential rib provided centrally on the roll 2c and extending radially thereof. The rib 45 is arranged to enter the space $a$ between the seaming walls of each pipe A as the pipe is delivered to the rolls 2. The purpose of the rib 45 is to maintain the longitudinal side edges of the seaming walls separated while the progressive portions of the pipe pass to the electrodes or brushes of the welding apparatus 3 and also to guide the pipe in relation to these electrodes or brushes and prevent any rotation of the pipe relative thereto. The rib 45 cooperates with the rolls 4c, 4c, which engage the pipe at opposite sides of the welding bead $a'$ (see Fig. 6) and rolls associated with the welding apparatus to insure feeding of the pipe endwise with the seaming walls $a$ aligned with the current supply brushes of the welding apparatus.

The spacing device and sets of rolls and rolls associated with the welding apparatus, acting on the walls of the body, insure the moving of the side edges $a$ together at the proper angle to insure an effective welding flash dependent upon the thickness of the body walls, the characteristics of the metal thereof and rate of movement of the body endwise relative to the welding apparatus.

The annular rib 45 may be removable so that a rib of different thickness or height may be substituted when found desirable.

Figs. 4a and 4b illustrate a construction wherein the spacing device is independently mounted. In this form of construction, 2a' indicates the upper roll, 2b' indicates the side rolls and 2c', 2c', indicate the lower rolls. 45a indicates the spacing device consisting of a roller loosely mounted on a shaft carried at the outer end of a bracket 45b. The bracket may be pivoted to a cross plate 45c, which may be mounted on the frame 1a or adjacent standards 5. By means for a pair of bolts 45d and locking nuts thereon, the bracket may be adjusted (see dotted lines in Fig. 4a) to position the spacing device 45a in operative relation to the side edges $a$ of the body A dependent upon the diameter thereof.

46 indicates as an entirety finishing mechanism arranged to shear off the welding bead, whereby the exterior surface of the pipe A is made relatively smooth and uniform throughout its entire circumference. Of this mechanism, 47 indicates a pair of guide rolls. 48, 49, indicate two shearing devices spaced longitudinally of the direction of travel of the pipe and mounted upon axes disposed at opposite sides of the axis of the pipe. The cutting or shearing edges of the devices 48, 49, are shown disposed at an angle to the horizontal and overlapping a vertical plane cutting the axis of the pipe, whereby they co-operate to entirely remove the metal of the welding bead $a'$, altho the invention is not to be limited to two cutting devices, as one only or more than two may be used when desired. 50 indicates an abutment roll associated with each cutting device, and 50a indicates upper rolls engaging with the top portion of the pipe, each roll being preferably disposed immediately above one of the cutting devices 48, 49, and co-operating with the guide rolls 47 and abutment rolls 50 to maintain the pipe in operative relation to the cutting devices.

The guide rolls 47 are disposed immediately in front of the cutting device 48 and serve to support and guide the pipe, while preventing its rotation about its own axis, to insure delivery of the pipe and its bead in proper relation to the cutting devices.

The guide rolls 47 are arranged in opposed relation and are concaved to engage the pipe at opposite sides of the bead $a'$, their inner circumferential edges being cut away to receive the bead $a'$, as shown in Fig. 7. Each roll 47 is mounted on a stud shaft 51, supported by a standard 52. The shaft 51 is provided with a sleeve 53, which forms a seat for a thrust bearing 54. Each standard 52 is adjustably fixed to a base 55, by bolts 55$^x$, whereby the adjacent roller may be moved transversely of the apparatus. The base 55 is adjustable vertically as will be later set forth.

Each device 48, 49, consists of a rotary shearer mounted in the following manner: 56 indicates a block having a base portion 56a slidably engaging the base 55, the base portion being bolted to the base 55 by bolts 57. As shown in Fig. 9, the openings for the bolts 57 are elongated which permits the block to be adjusted transversely of the apparatus. The adjustment may be effected by means of a screw 58, threaded through a plate 59, which is secured to the base 55 in the manner to be later set forth. The screw also serves as an abutment to take any thrust on the block 56 and thus to supplement the clamping effect of the bolts 57. The base portion 56a is provided on its lower face with a rib, which slidably fits a groove 55' formed in the base 55. The block 56 is shaped to provide a spindle 60 for a wheel 61, which is mounted on suitable taper roller bearings, and an annular guard 62, which together with a guard 63 on the wheel 61, serves to protect the bearings from metal particles that result from the operation of the cutter. The inner race for the lower bearing seats against the top of the base, whereas the outer races for both bearings seat against the opposite sides of a rib on the inner wall of the wheel 61; the inner race for the upper bearing being held in position by a plate 64. The plate 64 is secured to the top wall of the spindle by one or more screws (see Figs. 10 and 15). The outer end of the wheel 61 is formed with an annular seat 61a to receive the cutter 48 comprising a ring member. The wheel 61 is shaped to provide a relatively wide rim which rotates in close engagement with the inner wall of the guard 62 and the guard 63 depends from the periphery of the seat 61a and surrounds the upper end of the guard 62, these portions serving to prevent foreign matter and metal particles from getting into the bearings. I also provide a cover 65 which is removably secured to the wheel 61 and closes the upper end of the bearing and space within the wheel to prevent foreign matter and metal particles from finding their way into the bearings.

Each abutment roll 50 is mounted on a shaft 66, preferably by means of suitable anti-friction bearings, as shown in Fig. 7. The opposite ends of the shaft 66 are mounted in a yoke 67, which is suitably secured to a supporting member 68 by bolts 67a, the openings 67b for the bolts being elongated (see Fig. 12) to permit adjustment of the yoke upwardly and downwardly to properly relate the adjacent roll to the walls of the pipe A. The member 68 is adjustably fixed to the base 55 by bolts 69, the openings for the bolts being elongated to permit of adjustment of the member 68 transversely of the apparatus. The adjustment inwardly may be effected by a screw 70, threaded through a plate 71, which is supported similar to the plates 59, as will later appear. The bottom face of each member 68 is provided with a rib which slides in the adjacent groove 55'. The screw 70 serves to take any outward thrust imparted to the supporting member 68.

Each auxiliary roll 50a is rotatably supported on suitable bushings 72 surrounding a shaft 73 and adjustably held in operative relation to the rolls 50, 50, between a pair of split collars 74, suitably secured together and to the shaft 73 by the bolts 75. Each shaft 73 is supported in the manner hereinafter set forth.

76 indicates standards suitably fixed to and rising from the frame 1b and each formed with vertically extending guide ways 77 aligned with the ways in the other standard. The bottom portions of the standards below the ways 77 are hollowed out to receive the necks of flanged nuts 78 in which are threaded jack screws 79. As shown in Fig. 7, the base 55 is provided with laterally extending arms 80 which project into the ways 77 and rest on the jack screws 79, a thrust bearing 81 being interposed between each arm 80 and the head of the adjacent jack screw 79, whereby the latter may be readily rotated to adjust the base 55 and other parts supported on the arms 80 of the latter. As shown in Figs. 7, 9, and 10, the plates 59 and 71 are fitted between and engage the ways 77 and are mounted on the arms 80 and secured thereto by bolts 82, which extend through the feet 83 provided at the lower ends of upright supporting members 83a and the plates, and have their lower ends threaded into openings (not shown) formed in arms 80. The body portions of the members 83a are hollowed out and have threaded walls 84 to adjustably receive jack screws 85 on which are supported hollow blocks 86. The blocks 86 receive the reduced ends of the shafts 73, the shoulders 73a formed by the reduced ends engaging the blocks 86 to prevent endwise movement of the shafts. 87 indicates screws threaded through the upper walls of the standards 76 and each engaging the adjacent block 86 to secure it rigidly against the adjacent jack screw 85. By loosening the screws 87, the base 55 may be adjusted, by rotation of the jack screws 79, to raise or lower the mechanism 46 and the shafts 73 may be adjusted relative to the base 55 by rotating the jack screws 85.

Figure 14:
Figure 14A:
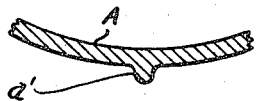
Figure 14B:
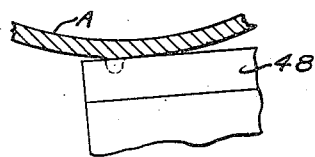
Figure 14C:
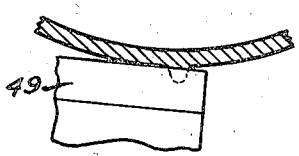

The cutting devices 48, 49, are arranged to entirely remove the bead a'. As shown in Fig. 14b, the device 48 is arranged in a plane that is substantially tangential to the pipe at one side of the bead and extends to or beyond the opposite side of the bead, whereas the device 49 is arranged in the same relation to the bead, but at the opposite side thereof so that the portion of the bead remaining on the pipe after passing the device 48 is removed by the device 49, as shown in Fig. 14c.

The welding apparatus 3 is preferably of the resistance type and comprises a pair of spaced members 138 suitably secured to brackets 139, the latter being fixed between the pairs of standards 5 and supported on the frame 1a. These members 138 are supported between the sets of rolls 2 and 4 and are formed with aligned openings 140, through which the formed pipes or cylinders are fed, the openings being somewhat larger than the outside diameter of pipes. Each member is formed with a plurality of recesses 141 extending radially outwardly from the opening 140. Two of the recesses 141 are disposed at opposite sides of the space between the side edges a and have mounted in them slides 142 carrying between bifurcations on their ends thrust rollers 143 which engage the outer wall of the pipe and each alternate recess 141 around the pipe A is provided with slides 142 carrying between bifurcations on their outer ends rollers 143, these rollers 143 in one member 138 and the rollers 143 in the other member 138 serving to move the edges a together as the progressive portions of the pipe feed through the members 138. Each slide 142 is threaded to receive a threaded screw 142a which extends through a suitable opening formed in the member 138 and extending from the bottom of the adjacent recess 141 to the outer wall of the member. At its outer end the screw is provided with a worm gear 142b in mesh with a worm 142c the shaft of which carries a hand wheel 142d. By turning the hand wheels, the rollers 143 can be adjusted toward or from the pipe A whereby they may co-operate with each other to compress the edges a together. Each of the remaining recesses 141 in each member 138 receives and supports a block 144 provided with current supply brushes 145 of suitable construction, which brushes engage or have contact with the walls of the pipe to permit flow of the current from the brushes on one side thereof to the brushes on the other side of the pipe, the resistance between the edges a serving to heat the metal thereof and effect their welding. The set of rolls 4 cooperate with the sets of rollers 143 to maintain the pipe edges a together while welding takes place and during cooling of the welded joint. From the set of rolls 4 the pipe passes to the finishing or bead shearing mechanism 46.

Provision is made for adjusting the shearing mechanism toward and from the welding mechanism 3 and set of rolls 4. For this purpose the frame 1b is mounted on tracks 88, suitably secured by bolts 89 to the flooring. The frame 1b is provided with shoes or guides 90 to slidably engage the tracks 88, but instead of the shoes, wheels or rollers may be substituted. The adjustment of the frame 1b and mechanisms carried thereby is preferably effected by a power means 91 comprising the following: 92 indicates an electric motor mounted centrally on the frame 1c. The shaft of the motor extends in opposite directions and is connected by flexible couplings to shafts 93. The shafts 93 are drivingly connected, preferably by worm gearing within gear boxes 94, to shafts 95, which are connected by flexible couplings to the outer ends of feed screws 96. The outer ends of the feed screws are rotatably supported in bearings in pillow blocks 97 secured to the frame 1c. The inner ends of the feed screws 96 are threaded into nuts 98, keyed to the internal wall of a tubular member 99, the flange of which is suitably bolted to the rear side wall of the frame 1b (see Fig. 13).

100 indicates a pair of delivery rolls arranged beyond the finishing mechanism 46 and arranged to pull the pipes A outwardly. Each roll 100 is keyed to a shaft 101, the lower end of which rotates in upper and lower taper roller bearings 102, mounted in a support 103. The opposite sides of the support 103 is provided with lateral flanges 104 which slide in ways 105 provided on the front and rear walls of a casing 106, plates 107 being bolted to the casing walls and lapping over the flanges 104 to maintain the latter in the ways 105. The flange 104 may be slightly thicker than the depth of the ways 105, so that when the bolts for the plates 107 are tightened, the latter secure the flanges 104 to the ways and thus rigidly secure the supports 103 in adjusted position. The casing 106 is bolted to the base portion of the outer portion of the frame 1b. The upper bearing 102 is closed by a collar 101a, which engages the inner race of the bearing and supports the shaft in position. The inner race of the lower bearing is engaged by a ring 108, which is held in position by a nut 109 threaded on the shaft 101, to thus prevent upward movement of the latter. The shaft 101 extends through the support 103 and carries on its lower end a bevel gear 110, which meshes with a bevel gear 111. The gear 111 is provided with keys 111a which slide in grooves formed in a transverse shaft 112, whereby the shaft will drive the gear 111. The gear 111 is connected to a bracket 113, depending from the support 103, so that when the latter is adjusted, it will move therewith, the keying of the gear 111 to the shaft 112, permitting of such adjustment. The shaft 112 is mounted in suitable bearings provided in the end walls of the casing 106, and one end of the shaft is extended and connected by a flexible coupling to a shaft 114. The shaft 114 is provided with a worm gear 115, meshing with a worm 116, which is secured to a shaft 117. The shaft 117 is connected through a flexible coupling to the shaft of a motor 118, which is mounted on the frame 1b.

The upper ends of the shafts 101 are preferably connected to relieve them of bending strains as well as undue strains on their supporting bearings, the connections comprising the following instrumentalities: 119 indicates a collar surrounding the upper end of each shaft 101 and provided on one side with an internally threaded boss 120. The inner wall of the collar 119 is enlarged as shown in Fig. 8 to receive anti-friction rollers 121 on which the shaft rotates, the roller receiving space being closed by a ring 122, which is bolted to the collar, and a washer secured by a bolt 123 threaded into the free end of the adjacent shaft 101. 124 is a double ended screw threaded into the bosses 120 as shown in Fig. 8, the threads on the ends of the screw being reversed so that by turning the screw the collars may be adjusted to support and maintain the upper ends of the shafts 101, in position, according to the adjustment of the supports 103, whereby the shafts may be driven and the rolls 101 held in engagement with the pipe A with sufficient pressure to effect feeding of the latter outwardly.

The supports 103 are adjusted in either direction, in the ways 105, by means of screws 125, each rotatably connected to the adjacent support 103 and threaded through an opening 126 formed in a bar 127. Each bar 127 is suitably bolted to the end wall of the casing 106. The inner end of the screw 125 has a round portion rotatably extending through an opening formed in the wall of a recessed plate 128, which is suitably secured to the outer side wall of the adjacent support. The inner free end of the screw 125 is provided with a head 129 rotatably fitting the recess in the plate 128 and arranged to engage the bottom wall of the recess and move the support 103 outwardly when the screw is rotated in one direction and to engage the support and move it inwardly when the screw is rotated in the opposite direction. The screws 125 also operate as thrust members to resist outward movement of the supports due to the engagement of the rolls 100 with the pipe A, thereby co-operating with the plates 107 to hold the supports 103 in their adjusted position. The screws 125 are locked by nuts 130.

131 indicates as an entirety a mechanism for cutting up the bead a' as it is sheared off by the forward cutting device 48. The mechanism 131 is arranged on the under side of the base 55, the support therefor being secured to the base, so as to be adjustable therewith.

For this purpose, I form in the base 55 an opening and mount therein a hopper 132 arranged to receive the portions of the bead as the latter is cut off by the cutting device 48. The hopper 132 is provided with an inclined wall 133 which directs the bead portions downwardly and against a shearing wall 134. 135 indicates a plurality of knives which co-act with the shearing wall 134 to cut up the bead portions as they fall through the hopper, the knives being carried by radial arms 135' on a hub 135a fixed to a vertical shaft 135b. The shaft 135b is mounted in suitable bearings in a gear box 136 and driven by gearing operated by the shaft of a motor 136a. The gear box 136 and motor 136a are secured in a yoke 137 which is suitably bolted to the under side of the base 55.

Fig. 16 illustrates a different form of construction consisting of a set of rolls which may be used as the feeding rolls disposed in front of the welding apparatus 3 and a similar set used for the delivery rolls disposed rearward of the welding apparatus. The set of rolls shown is adapted to be positioned rearward of the welding apparatus so that the two side rolls may engage the pipe A at opposite sides of the bead a'; but when used as feeding rolls in front of the welding apparatus, the inner side edges of the lower rolls of the set are arranged closer together so that the rolls will engage substantially the entire circumference of the pipe A, as already described in connection with the set of rolls 2. However, these lower rolls, even when used as the feeding rolls, may be spaced from each other, as shown in Fig. 16, to provide space (1) for supporting members of the welding apparatus where the latter or parts thereof are to be mounted within the pipe, or (2) for a spacing device 45a as shown in Figs. 4a and 4b.

Referring to Fig. 16, 146 indicates the standards mounted on a frame 1a', being guided thereon by means of ribs 147 fitting grooves in the base portions of the standards to permit adjustment of them relatively to each other. The frame 1a' may also be provided with shoes 148 which adjustably engage guides 149, to permit adjustment of the rolls toward or from the welding apparatus, and these parts may be secured together by clamping bolts 150.

Each standard comprises spaced portions connected by a cross member 151 and a bridge plate 152, which is suitably bolted to the upper ends of the spaced portions. The standards 146 may be braced by a plurality of rods 146' (one only being shown) having nuts 146b threaded on their outer ends and tightened against the standards to secure the latter to spacing sleeves, which surround the rods and engage the standards at their opposite ends. In this form of construction I provide an upper roll 153 and two lower rolls 154 disposed at angles, whereby only three rolls are required. In this arrangement, each roll is preferably of sectional construction, the intermediate section being positively driven and the outer side sections being free to rotate on anti-friction bearings disposed between each outer roll section and the intermediate roll section.

The intermediate section 153a of the upper roll is suitably keyed to a shaft 155, the opposite ends of which rotate in pairs of taper bearings 156 provided in journal boxes 157. The boxes 157 are vertically adjustable between the spaced portions of the standards. The bottom wall of each box is inclined and engages the inclined wall of a wedge member 158. The wedge member 158 adjustably engages the cross member 151, being adjustably fixed thereto by a bolt 159 threaded thereinto and extending through a depending flange provided on the wedge member. The bolt 159 is provided on opposite sides of the flange with nuts 160, which when tightened thereagainst, hold the wedge member in adjusted position. Each journal box is held against the adjacent wedge member 158 by a compression spring 160' supported between annular abutments 161, 161a, the former engaging the journal box and the latter being held in fixed position by an adjusting screw 162 threaded through a sleeve nut 163 fitted into an opening formed in the adjacent bridge plate 152. The screw 162 is locked in adjusted position by a nut 162a. The upper end of the screw 162 is provided with a hand-wheel 164 by which it may be turned. The shaft 155 is cut away or reduced to provide at one side of the roll 153 a collar 155a, which forms a seat for the hub of a bevel gear 165 (the gear preferably having herring-bone teeth), which hub is keyed to the shaft so as to be rotated thereby. At the opposite side of the roll 153 is a bevel gear 166 also keyed to the shaft 155. By means of a nut 167 threaded on the shaft 155, and engaging the hub of the gear 166, the gears 165, 166 and roll 153a are secured together and against the collar 155a. The gears 165, 166, mesh with bevel gears 168, 169, respectively, the hubs of which are fixed to shafts 169' respectively, to drive them. The intermediate sections 154a of the rolls 154 are suitably keyed to the shafts 169' as shown. Each shaft 169' is mounted in a similar manner as follows: 170 indicates a support formed in two sections 170a, 170a' having internal flanges 171 suitably bolted together. The supporting sections are provided with arms which terminate in semi-circular collars, to which are bolted semi-circular collars 172, 173, these parts serving to support anti-friction bearings. The upper end of each shaft 169' is mounted in a single roller bearing and the lower end thereof is supported in a pair of taper roller bearings, whereby the latter take end thrusts. Each support 170 is mounted at the desired angle to support the adjacent roll 154 in the desired relation to the other roll 154 and the roll 153. The support 170 is adjustable on a radius of the axis of the pipe A, being slidably mounted between guides consisting of a pair of side plates 174, a top plate 175 and a bottom plate 176. Each plate 174 is provided with extensions 174a, which are bolted to the adjacent portions of the standards, and its intermediate portion is secured by bolts 177 to a wing 146a extending outwardly from the adjacent side portion of the standard 146. The top plate 175 is secured to the upper ends of the side plates 174 by bolts 178. The bottom plate 176 forms part of a bracket 176a, which is bolted to a base 179 extending upwardly from the base portion of the standard 146 between its spaced portions. The support 170 is held in adjusted position in its guides as follows: 180 indicates bridges suitably bolted at their opposite ends to the outer end walls of the side plates 174. The bridges are formed with openings to receive sleeve nuts through which are threaded adjusting screws 181. The inner ends of the screws 181 extend through openings formed in the bottom walls of recessed members 182 and are provided with heads 183 which rotatably engage bearing plates mounted within the recessed members and non-rotatably seated in depressions formed in the outer wall of the support 170. The recessed members 182 are bolted to the adjacent walls of the supporting sections 170a, 170a'. By rotating the screws 181 the support 170 may be moved inwardly or outwardly. These screws 181 also take the outward thrust due to the pressure of the adjacent roll with the pipe A.

The shaft 155 has an extended end 155' which may be connected to a driven shaft in any desired manner, for example, as shown in my aforesaid co-pending application. The standard 146 adjacent the drive mechanism may be connected to the frame for supporting the driving mechanism by connections 184. It will be noted that the gears are connected to the roll shafts and are therefore driven at the same speed as the intermediate sections of the rolls. The gears 165, 166, and gears 168, 169, have predetermined ratios to insure the same peripheral speed of the intermediate sections of all three rolls.

Fig. 15 illustrates a modified form of construction in which the shearing device may be adjusted at a different angle as well as transversely of the support 55. In this form of construction, the inner end of the base portion 56a is provided with a pair of knuckles 185 which register with the openings in up-standing lugs 186 on the base 55 to receive a pivot 187 (one knuckle, one lug and one pivot only being shown) to permit the base portion to swing upwardly, to adjust or position the shearing device 48 (or 49) at the desired angle. The adjustment of the base portion 56a is effected by a screw 188 threaded through an opening 189, which is formed in the rear end of the base portion. The screw 188 bears on the base 55 when rotated. As the base portion serves as a nut when the screw 188 is rotated, the base portion may be adjusted to the desired angle. The screw 188 is locked by a nut 190.

To those skilled in the art to which my invention relates, many changes in construction and widely differing embodiments and applications of the invention will suggest themselves without departing from the spirit and scope thereof. The disclosures herein and the description are purely illustrative and are not intended to be in any sense limiting.

What I claim is:

1. In apparatus of the class described, the combination of a support, a set of rolls thereon for feeding endwise hollow bodies having longitudinal welding beads, means for driving certain of said rolls, a mechanism for shearing off the bead on each body, said shearing off mechanism including a cutter freely rotatable in a plane substantially tangential to the outer surface of the body and an abutment member disposed on that side of the bodies remote from said cutter and arranged to be engaged by the bodies during their endwise movement.

2. In apparatus of the class described, the combination of a support, a set of rolls thereon for feeding endwise hollow bodies having longitudinal welding beads, means for driving certain of said rolls, a mechanism for shearing off the bead on each body, said shearing off mechanism including a pair of cutters disposed in spaced relation longitudinally of the body and at opposite sides of the bodies, and an abutment roll for each of said cutters disposed on that side of the bodies remote from the adjacent cutter and arranged to be engaged by the bodies during their endwise movement.

3. In apparatus of the class described, the combination of a support, a set of rolls on said support for feeding endwise hollow bodies having longitudinal beads, and means for shearing off the welding bead during feeding of each body, said means comprising a spindle on said support, a wheel mounted on said spindle, a guard on said support surrounding said wheel, a rim on said wheel cooperating with said guard to protect the bearing for the wheel and a cutter fixed to said wheel.

4. In apparatus of the class described, the combination with a support and a pair of standards mounted thereon and formed with ways, a pair of journal boxes in said ways, a horizontal shaft mounted in said boxes, means for driving said shaft, a roll on said shaft arranged to engage the top portion of a hollow body, a pair of supporting elements on each box and the bottom of the adjacent way, a vertical shaft mounted in each pair of elements, a roll on each said vertical shaft arranged to engage the adjacent side portion of the body, driving connections between the roll on said horizontal shaft and the rolls on said vertical shafts, and a roll between said standards arranged to engage the bottom portion of the body, said rolls having arc shaped peripheries and correlated to engage substantially the entire circumference of the body.

5. In apparatus of the class described, the combination with a support and a pair of standards mounted thereon and formed with ways, a pair of journal boxes in said ways, a roll on said shaft arranged to engage one side of a hollow body, a pair of supporting elements on each box and the bottom of the adjacent way, a vertical shaft mounted in each pair of elements, a roll on each said shaft arranged to engage the body, a roll between said standards arranged to engage the opposite side of the body, said rolls having arc shaped peripheries and correlated to engage substantially the entire circumference of the body, and means for adjusting said first mentioned shaft, each of said elements and the last mentioned roll toward and from the axis of the body.

6. In apparatus of the class described, the combination with a support and a pair of standards mounted thereon and formed with ways, a pair of journal boxes in said ways, a horizontal shaft mounted in said boxes, a roll on said shaft arranged to engage one side of a cylindrical body, a pair of supporting elements on each box and the bottom of the adjacent way, a vertical shaft mounted in each pair of elements, a roll on each said shaft arranged to engage the body, a roll between said standards arranged to engage the opposite side of the body, said rolls having arc shaped peripheries and correlated to engage substantially the entire circumference of the body, means for driving said first mentioned shaft, and gearing between the roll on said driven shaft and the rolls on said vertical shafts.

7. In apparatus of the class described, the combination with a support and a pair of standards mounted thereon and formed with ways, a pair of journal boxes in said ways, said boxes being provided with anti-friction bearings, a horizontal shaft mounted in said bearings, a roll on said shaft arranged to engage one side of a cylindrical body, a pair of supporting elements on each box and the bottom of the adjacent way, a vertical shaft mounted in each pair of elements, a roll on each said shaft arranged to engage the body, anti-friction bearings between each vertical shaft and the roll thereon, a roll between said standards arranged to engage the opposite side of the body, and means for adjusting each pair of elements toward or from the axis of the body.

8. In apparatus of the class described, the combination of a support, a pair of supporting elements slidably mounted on said support for adjustment toward or from each other, a shaft having one end portion extending through each said element, taper roller bearings between each said shaft and the adjacent supporting element, gearing connected to each said shaft beyond its supporting element, rolls on the opposite end portions of said shafts, and adjustable connections between said shafts beyond said rolls, and including anti-friction bearings for said shafts.

9. In apparatus of the class described, the combination with a support, of means for feeding endwise hollow bodies each having a longitudinally extending welding bead thereon, a device mounted to rotate in a plane substantially tangential to the outer surfaces of the bodies for shearing off the welding bead as each body is moved endwise, a roll disposed upon that side of the body remote from said device and substantially in opposed relation thereto and arranged to support and guide each body in an endwise direction, and means between said feeding means and said shearing device and arranged to engage each body at opposite sides of the bead thereon to prevent rotation of the body during its endwise movement.

10. In apparatus of the class described, the combination with a support, of a pair of rolls on said support arranged to engage a hollow body at the opposite sides of a longitudinally extending welding bead thereon to prevent rotation of the body, means for feeding the body endwise, a pair of devices spaced longitudinally of the support upon opposite sides of the welding bead and each mounted to rotate in a plane substantially tangential to the outer surfaces of the bodies for shearing off the welding bead as the body is moved endwise, and a roll in substantially opposed relation to each of said devices on that side of the body remote from said devices and arranged to support and guide the body in an endwise direction.

11. In apparatus of the class described, the combination with a support, of a pair of standards mounted thereon, journal boxes mounted on said standards, a horizontal shaft mounted in said boxes, vertical shafts supported between said boxes and walls of said standards, a pair of shafts independently supported on said standards, respectively, and a set of rolls for engaging hollow bodies, said set comprising a top roll mounted on said horizontal shaft, side rolls mounted on said vertical shafts and rolls mounted on said independently supported shafts and arranged to engage the bodies below said side rolls, said last mentioned rolls being disposed at angles to each other, and means for driving said top roll and side rolls.

12. In apparatus of the class described, the combination with a support and a pair of standards mounted thereon, of a set of rolls having their peripheries co-operatively related to engage substantially the entire circumference of a cylindrical body, shafts mounted on said standards for supporting said rolls, respectively, each said roll comprising an intermediate section keyed to the adjacent shaft and outer sections rotatably mounted on said intermediate section, gearing between said shafts, and means for driving one of said shafts.

13. In apparatus of the class described, the combination of a support, a set of driven rolls thereon for engaging bodies having longitudinal welding beads, a cutter rotatable in a plane substantially tangential to the surface of each body for shearing off the welding bead, a pair of rolls in front of said cutter and engaging the body at either side of the welding bead to prevent rotative movement of the body as it moves past said cutter, and a roll engaging the body diametrically opposite to said pair of rolls and co-operating therewith to guide the body relative to said cutter.

14. In apparatus of the class described, the combination of a support, a set of driven rolls thereon for engaging bodies having longitudinal welding beads, a cutter rotatable in a plane substantially tangential to the surface of each body for shearing off the welding bead, a pair of rolls in front of said cutter and engaging the body at either side of the welding bead to prevent rotative movement of the body as it moves past said cutter, a roll engaging the body diametrically opposite to said pair of rolls and co-operating therewith to guide the body relative to said cutter and a roll engaging the body substantially opposite said cutter.

15. In apparatus of the class described, the combination of a support, a set of driven rolls thereon for engaging bodies having longitudinal welding beads, a rotary cutter disposed in a plane substantially tangential to that portion of the body having the welding bead, an abutment roll engaging the body substantially opposite said cutter, and separate means for adjusting said cutter and roller in a direction transverse to the body.

16. In apparatus of the class described, the combination with a support, of means on said support for feeding endwise hollow bodies each having a welding bead, a pair of standards on said support, a transverse shaft supported by said standards and provided with a roll arranged to engage each body as it moves endwise, an intermediate support, devices on said intermediate support arranged to engage each body at opposite sides of its welding bead to prevent rotative movement of the body, a shearer on said intermediate support and operating in a plane substantially tangential to the body for shearing off the bead thereon, a guide roll on said intermediate support and disposed in opposed relation to said shearer, separate means for adjusting said shearer and said guide roll, and means for adjusting said intermediate support on said first mentioned support.

17. In apparatus of the class described, the combination of a support over which hollow bodies having a longitudinal bead are moved endwise, a cutter mounted on said support to rotate in a plane substantially tangential to the bodies for shearing the beads therefrom, and a pair of rolls, one disposed substantially diametrically to said cutter and the other disposed substantially diametrically to the beads on the bodies, for maintaining the bodies in operative relation to said cutter.

18. In apparatus of the class described, the combination of a support, a pair of supporting elements slidably mounted on said support for adjustment toward or from each other, a shaft having one end portion extending into each said element, anti-friction bearings between each shaft and the adjacent supporting element for rotatably supporting said shaft therein, gearing connected to each shaft at one side of the adjacent supporting element, rolls on said shaft for engaging a hollow body; and adjustable connections between the opposite end portions of said shaft outwardly of said rolls, said connections including anti-friction bearings between the shafts and said connections.

CARL M. YODER.